United States Patent [19]
Fujiwara et al.

[11] Patent Number: 5,267,099
[45] Date of Patent: Nov. 30, 1993

[54] DIGITAL SIGNAL RECORDING/REPRODUCING SYSTEM

[75] Inventors: Mikio Fujiwara, Neyagawa; Sigekazu Togashi, Katano; Yasunori Kawakami, Osaka; Toshihiro Uehara, Kawasaki; Hotaka Minaguchi, Ebina, all of Japan

[73] Assignees: Matsushita Electric Industrial Co., Ltd., Osaka; Nippon Hoso Kyokai, Tokyo, both of Japan

[21] Appl. No.: 670,418

[22] Filed: Mar. 18, 1991

[30] Foreign Application Priority Data

Mar. 23, 1990 [JP] Japan ................................ 2-73805

[51] Int. Cl.⁵ .......................................... G11B 27/30
[52] U.S. Cl. .................................... 360/51; 360/41
[58] Field of Search .............. 360/51, 40, 41, 36.2, 360/53, 65; 358/343

[56] References Cited

U.S. PATENT DOCUMENTS

| | | | |
|---|---|---|---|
| 4,549,227 | 10/1985 | Hashimoto et al. | 360/32 |
| 4,604,655 | 8/1986 | Moriyama | 358/343 |
| 4,731,678 | 3/1988 | Takeuchi | 360/40 |
| 4,868,922 | 9/1989 | Tsuji et al. | 360/51 |

FOREIGN PATENT DOCUMENTS

| | | |
|---|---|---|
| 0147550 | 7/1985 | European Pat. Off. . |
| 0320022 | 6/1989 | European Pat. Off. . |
| 3427879 | 1/1986 | Fed. Rep. of Germany . |
| 1253874 | 10/1989 | Japan . |

OTHER PUBLICATIONS

"Design Considerations for the D-2 NTSC Composite DVTR", SMPTE Journal, Mar. 1988, pp. 182-193, Richard Brush.
"Recording and Reproducing System of DVR-10", ITEJ, Technical Report, vol. 12, No. 56, pp. 37-42, '88-61, (Dec. 1988), Isozaki et al.

Primary Examiner—Robert J. Pascal
Assistant Examiner—Tan Dinh
Attorney, Agent, or Firm—Stevens, Davis, Miller & Mosher

[57] ABSTRACT

A digital signal recording/reproducing system specifically has an adaptive automatic equalizer for performing automatic waveform equalization disposed in a reproducing circuit of an RF system. In order to provide a run-up pattern which enables stable operation settlement of the adaptive automatic equalizer and a clock reproducing PLL at the time of reproduction, the digital signal recording/reproducing system comprises a run-up code generator for producing a run-up pattern composed of a combination of at least two digital value series of different inversion intervals. Thus, since an optimum run-up pattern for the reproducing circuit of the RF system is produced and recorded on a recording medium within a fixed period at the time recording, stable settlement of the operation of the clock reproducing PLL and the adaptive automatic equalizer is attained within a run-up period at the time of reproduction, thereby making it possible to suppress occurrence of a code error to a minimum.

10 Claims, 5 Drawing Sheets

DIGITAL SIGNAL RECORDING/REPRODUCING SYSTEM

BACKGROUND OF THE INVENTION

1. Field of the Invention

The present invention relates to a digital signal recording/reproducing system having an adaptive automatic equalization function which makes automatic waveform equalization of a reproduced signal from a reproducing head when a video signal and an audio signal are digitally recorded and reproduced on and from a magnetic tape.

2. Description of the Related Art

The tendency of development and commercialization of VTR's in recent years is directed from analog VTR's to digital VTR's which are not subjected to the deterioration of the image quality and the audio quality caused by dubbing and have a high digital recording density. As one example of digital VTR's, there has been proposed a digital VTR [see ITEJ Technical Report Vol. 12, No. 56, pp. 37–42, VR '88–81 (Dec. 1988)] in conformity with the D-2 format (see "Design Considerations for the D-2 NTSC Composite DVTR", SMPTE, Journal, Mar. 1988) for which the deliberation on standardization was completed at the SMPTE Technical Conference on 1989. By the way, in a digital VTR which permits high density recording with more than 100 Mbps, it becomes very important in respect of performance to keep to a minimum a code error occurring during reproduction. As a reproduced signal waveform equalization system for suppressing the occurrence of a code error during reproduction, the above-mentioned D-2 format digital VTR employs a fixed equalization system in which a tap coefficient adapted for the characteristic of the electro-magnetic and magneto-electric conversion systems is set upon its delivery. However, such a fixed equalization system involves a problem that it is not possible for the fixed equalization system to keep the waveform equalization at the optimum for a change in characteristic of the electro-magnetic and magneto-electric conversion systems which may occur with the lapse of time caused by the abrasion of a head, etc. and a change in the characteristic of a recorded tape when it is subjected to interchangeable reproduction. As a result, it is not possible to suppress the code error to a minimum.

On the other hand, if an automatic equalization system is employed, there is an advantage such that not only the above problem can be solved but also initial adjustment and readjustment at the time of interchanging heads can be simplified. The automatic equalization system has been disclosed, for example, by JP-A-1-253874 assigned to the assignee of the present application. In the adaptive automatic equalization, a reproduced signal once subjected to equalization is applied to a zero-crossing detector, and two reproducted signals appearing at respective input and output ends of the zero-crossing detector are applied to an equalization characteristic controller, respectively, where a signal energy difference in a high frequency region and that in a low frequency region are detected by a high frequency error detector and a low frequency error detector, respectively, and an equalization characteristic controller determines an equalization amount based on the respective error signals in the two frequency regions to control an equalizer composed of a gain changer and a frequency characteristic changer. As a result, automatic waveform equalization is effected automatically so that a resultant signal after the equalization may become substantially equal in amplitude and frequency spectrum to an output signal of the zero-crossing detector.

In this adaptive automatic equalization system, however, in the case where a signal having a single repetition period, for example, a signal having a period of one half of a clock frequency is inputted, the signal energy is concentrated at the high frequency region of the two frequency regions for making error signal detection for the purpose of automatic equalization, so that no signal energy exists at the low frequency region. In this case, notwithstanding that the equalization characteristic in the low frequency region is deviated from the proper optimum equalization characteristic at an input point of the zero-crossing detector, the equalization characteristic controller erroneously judges the equalization in the low frequency region as being optimum or judges a low frequency portion of the reproduced signal as being dropped. Therefore, the equalization characteristic controller controls the equalizer so as to emphasize the low frequency portion. As a result, the equalization characteristic controller falls into an oscillating condition by itself and becomes unstable in operation, thereby causing an increase in a code error.

SUMMARY OF THE INVENTION

An object of the present invention is to provide a digital signal recording/reproducing system which is capable of making stable operation settlement of an automatic equalization controller to effect optimum equalization of a reproduced signal from a reproducing head when making high-density digital recording/reproduction, and in which, when performing data recording, a run-up pattern allowing a clock reproducing PLL to make a high speed response is recorded on a recording medium within a predetermined period, that is, a run-up period (which run-up signal is added to the top of each of a video sector, an audio sector, etc. on a helical track so as to bring a reproducing circuit of an RF system into a stable state within the run-up period), whereby, at the time of reproduction, the operation of the reproducing circuit of the RF system is stabilized within the run-up period, thereby making it possible to minimize the occurrence of a code error of important data which are to be reproduced after the run-up period.

To that end, a digital signal recording/reproducing system according to the present invention comprises code conversion means for producing code words from input data, sync pattern generating means for producing a sync pattern, run-up pattern generating means for producing a run-up pattern composed of a combination of at least two digital value series of different inversion intervals, change-over means for forming a time series of the code words, the sync pattern and the run-up pattern respectively produced by the code conversion means, the sync pattern generating means and the run-up pattern generating means in accordance with a recording format, and recording and reproducing means for recording and reproducing a signal on and from a recording medium.

With the above construction, it is possible to produce the run-up pattern by the run-up pattern generating means and to record it on the recording medium within a fixed period at the time of data recording so that signal energy is distributed balancedly without causing concentration of the signal energy at either one of two error signal comparison regions for making adaptive automatic equalization. Thus, stable waveform equalization can be performed by an automatic equalization controller. Further, since a clock reproducing PLL is operated by using reproduced data obtained by passing an optimally equalized reproduced signal through a zero-crossing detector, stable reproduction of a clock signal is made possible. Accordingly, it is possible to make sure detection of codes in a sync period and a data period which codes are continuously reproduced subsequently to signal reproduction within a run-up period. Also, since an equalizer can be settled into an optimum equalization state during reproduction within a run-up period, even if reproduction is made of portions where a recording state has changed stepwise at the time of edition, erroneous discrimination of codes in the sync period and the data period can be suppressed to a minimum amount, thereby providing a great practical effect.

DESCRIPTION OF THE PREFERRED EMBODIMENTS

An embodiment of the present invention will be explained with reference to the accompanying drawings.

Figure 1:
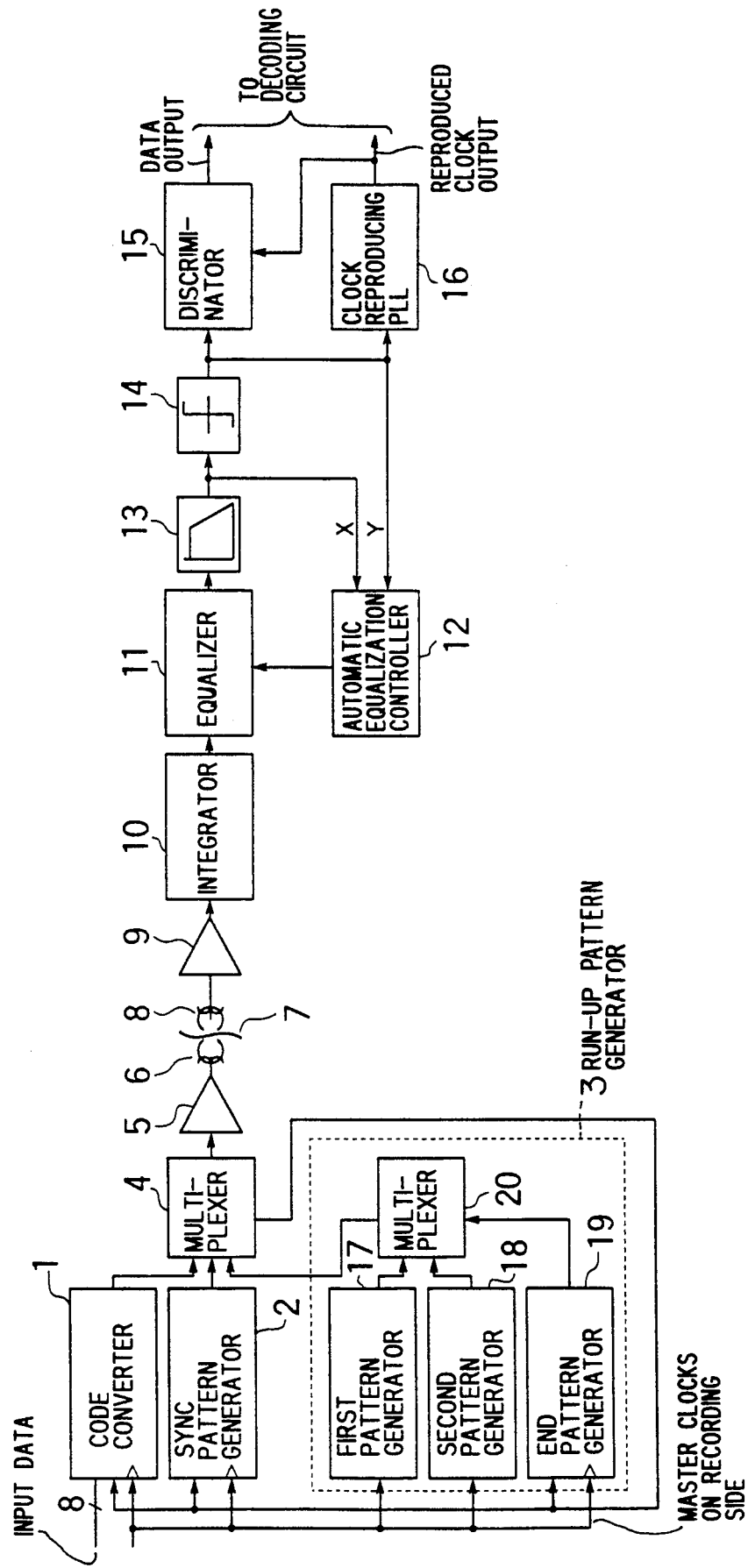
FIG. 1 is a block diagram showing a digital signal recording/reproducing system comprising a run-up pattern generator 3 which produces a run-up pattern according to the present invention.

In FIG. 1, a code converter 1 converts 8-bit input data to a code word with a bit length of $n=14$ bits satisfying the dk restriction in which the minimum number d of consecutive bits of the same binary value is 2 and the maximum number k of consecutive bits of the same binary value is 7. (The dk restriction means that the number of consecutive bits having the same binary value in a bit string obtained, when an m-bit data word is converted into n-bit code words and the n-bit code words after the conversion are connected with each other, is restricted not to be smaller than d and greater than k.) The code word produced by the code converter 1 is outputted to a multiplexer 4. A sync pattern generator 2 produces a sync pattern for use in data detection by a decoding circuit (not shown), and the produced sync pattern is outputted to the multiplexer 4. A run-up pattern generator 3 is composed of a first pattern generator 17, a second pattern generator 18, an end pattern detector 19 for detecting an end pattern (or form) of an immediately preceding pattern used to generate a run-up pattern, and a multiplexer 20. The run-up pattern generator 3 produces a run-up pattern according to the present invention and outputs it to the multiplexer 4. The code word produced by the code converter 1, the sync pattern produced by the sync pattern generator 2 and the run-up pattern produced by the run-up pattern generator 3 are switched by the multiplexer 4 in accordance with a recording format and are outputted to a recording amplifier 5. A recording head 6 records a recording signal on a recording medium 7. A reproducing head 8 reproduces the signal recorded on the recording medium 7 and outputs the reproduced signal to a reproducing amplifier 9. An integrator 10 outputs the reproduced signal to an equalizer 11 after making compensation for the differentiating characteristic of the electro-magnetic and magneto-electric conversion mechanisms. The equalizer 11 is controlled by an automatic equalization controller 12 and varies a gain and a frequency characteristic of the reproduced signal so as to make compensation for an inter-code interference of the reproduced signal which may occur in the recording/reproducing system. An output of the equalizer 11 is supplied to a low pass filter 13. The low pass filter 13 limits a band of the reproduced signal and the band-limited reproduced signal is outputted to zero-crossing detector 14 and the automatic equalization controller 12. The zero-crossing detector 14 detects the zero-crossing of the reproduced signal to digitize the reproduced signal into binary reproduced data which, in turn, is outputted to the automatic equalization controller 12, a discriminator 15 and a clock reproducing PLL 16. The automatic equalization controller 12 detects differences in signal energy (represented by error signals) between the reproduced signal at the input of the zero-crossing detector 14 and the reproduced data at the output of the zero-crossing detector 14 in two (high and low) frequency regions having respective cut-off frequencies in the vicinity of one eighth of a master clock frequency $f_m$, and determines an optimum amount of equalization from respective error signals in the high and low frequency regions. The optimum amount of equalization thus determined is outputted to the equalizer 11. The clock reproducing PLL 16 reproduces a clock signal from the reproduced data and outputs the clock signal to the discriminator 15 and a decoding circuit (not shown). The discriminator 15 discriminates the reproduced data at a period of the clock signal reproduced by the clock reproducing PLL 16 and outputs the reproduced data to the decoding circuit.

Next, the operation of the digital signal recording/reproducing system having the above construction will be explained.

Referring to FIG. 1, when 8-bit parallel data is inputted to the code converter 1, the code converter 1 selects and produces a 14-bit code word, which satisfies the dk restriction and which is free from d.c., from among a plurality of code words corresponding to the inputted 8-bit data, in accordance with the end pattern (or form) of an immediately preceding code word or a sync pattern of the serial data converted at the multiplexer 4 in accordance with the recording format. The selected code word is outputted to the multiplexer 4. In the sync pattern generator 2, a sync pattern satisfying a code word forming condition of the code converter 1 is selected and produced in accordance with an end pattern of an immediately preceding data pattern (code word), a run-up pattern or a sync pattern supplied from the multiplexer 4 and is outputted to the multiplexer 4. In the run-up pattern generator 3, from among run-up patterns satisfying a condition for short time settlement of the clock reproducing PLL 16 and the automatic equalization controller 12 as well as the code word producing condition of the code converter 1, the first and second pattern generators 17 and 18 produce first and second run-up patterns "00110000111100" and "11001111000011", which start from 0 and 1, respectively. The first and second run-up patterns are switched by the multiplexer 20 and outputted therefrom. The manner of switching between the first and second run-up patterns by the multiplexer 20, that is, whether a run-up period should be started from the first run-up pattern or the second run-up pattern, is determined by an end pattern of a code word supplied from the multiplexer 4. The multiplexer 20 controlled by an end pattern detected by and supplied from the end pattern detector 19 selects and outputs one of the first and second run-up patterns.

Figure 2:
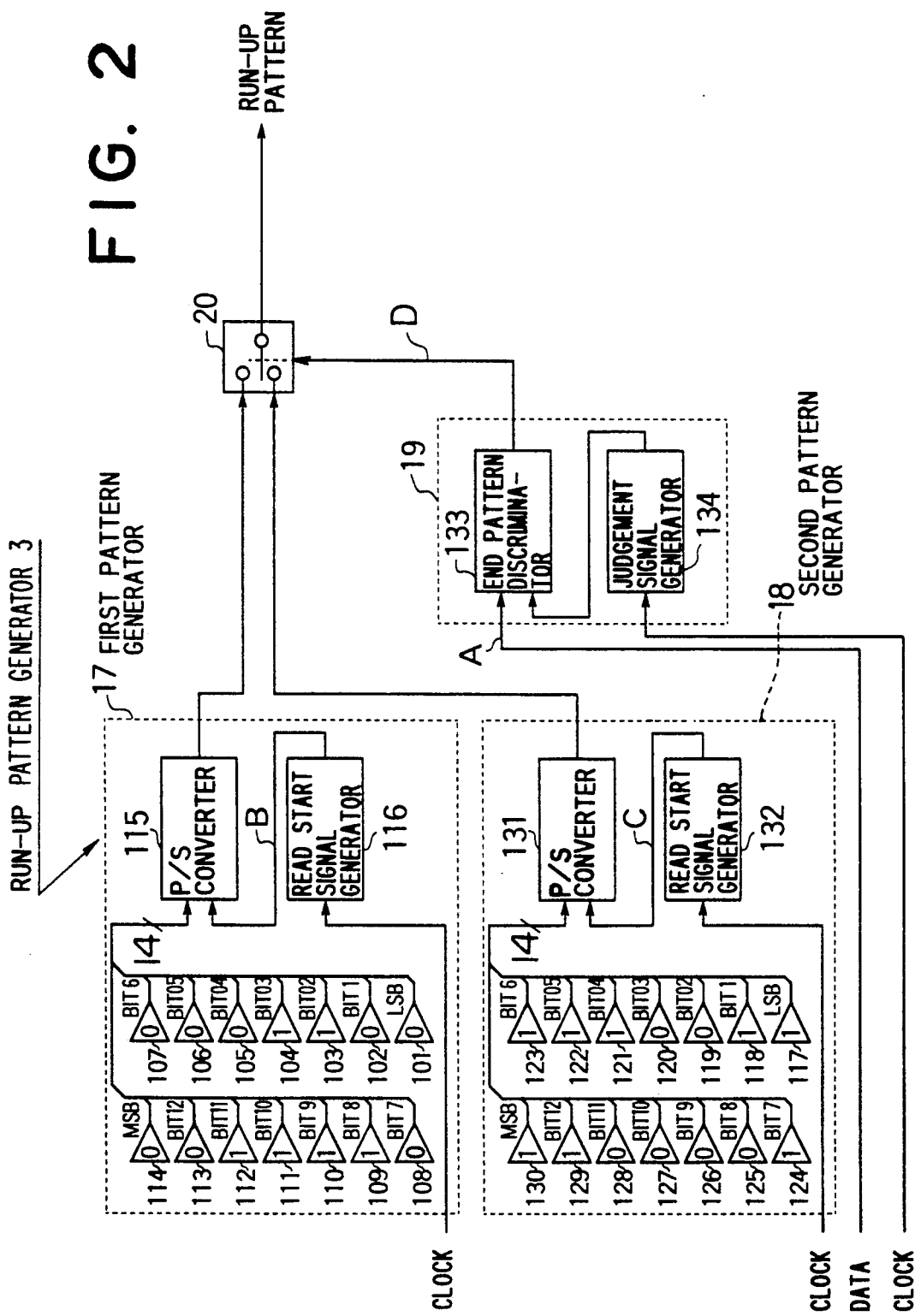
FIG. 2 is a detailed block diagram showing the detailed structure of the run-up pattern generator 3 of the present invention shown in FIG. 1.
Figure 3:
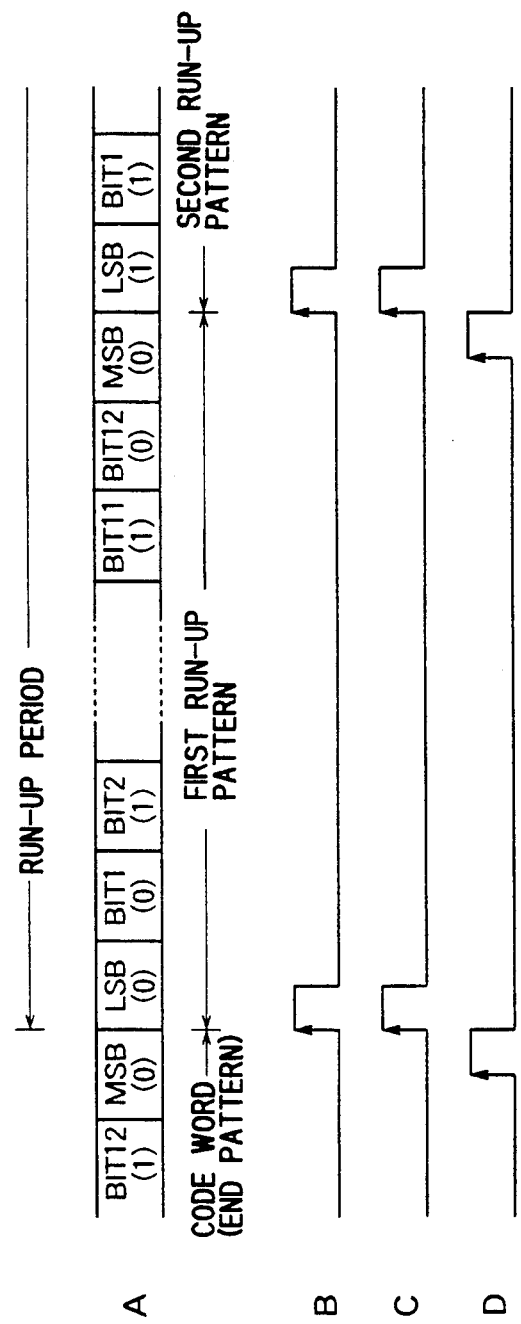
FIG. 3 is an signal timing chart showing the operation of the run-up pattern generator 3 shown in FIG. 2.

The operation of the run-up pattern generator 3 will now be explained in more detail by using FIGS. 2, 3 and 4. Referring to FIG. 2, in the first pattern generator 17, a first run-up pattern stored in memories 101 to 114 is supplied to a parallel/serial converter 115. By a read start signal supplied from a read start signal generator 116 and having the timing shown at B in FIG. 3, the parallel/serial converter 115 converts the first run-up pattern into a serial signal in the order from the LSB of the memory 101 to the MSB of the memory 114, and supplies the resultant serial signal to the multiplexer 20. In the second pattern generator 18, a second run-up pattern stored in memories 117 to 130 is supplied to a parallel/serial converter 131. By a read start signal supplied from a read start signal generator 132 and having the timing shown at C in FIG. 3, the parallel/serial converter 131 converts the second run-up pattern into a serial signal in the order from the LSB of the memory 117 to the MSB of the memory 130 and supplies the resultant serial signal to the multiplier 20. Whether the multiplexer 20 should select the first run-up pattern or the second run-up pattern as a starting pattern for a run-up period, is determined by an end pattern of an immediately preceding code word supplied from the multiplexer 4 to an end pattern discriminator 133 of the end pattern detector 19. When the BIT 12 of the end pattern of the immediately preceding code word is 1, as shown at A in FIG. 3, the first run-up pattern outputted from the first pattern generator 17 is selected in the multiplexer 20 by a judgement signal supplied from a judgement signal generator 134 at the timing shown at D in FIG. 3 so that a run-up pattern is outputted from the run-up pattern generator 3 to provide a first run-up pattern shown at (a) in FIG. 4. On the other hand, when the BIT 12 of the end pattern of the immediately preceding code word supplied from the multiplexer 4 is 0, the second run-up pattern outputted from the second pattern generator 18 is selected so that a run-up pattern is outputted from the run-up pattern generator 3 to provide a second run-up pattern shown at (b) in FIG. 4.

The run-up pattern, sync pattern and code word thus produced are converted into a time-series serial signal by the multiplexer 4 in accordance with the recording format. The time-series serial signal is supplied to the code converter 1, the sync generator 2 and the run-up pattern generator 3 and is also supplied through the recording amplifier 5 to the recording head 6 so that it is recorded on the recording medium 7 by the recording head 6.

Figure 5:
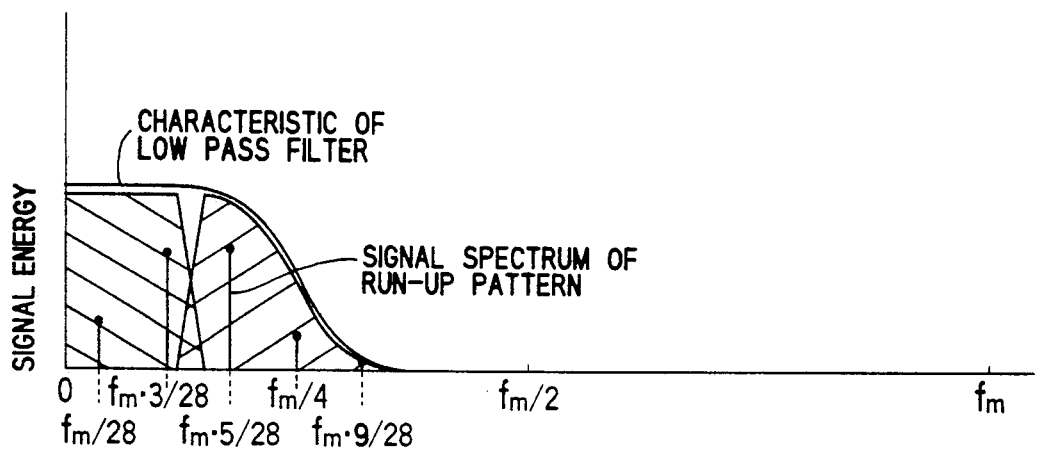
FIG. 5 is a frequency spectrum diagram showing a frequency spectrum, a band limit on the reproducing side, and error signal comparison regions of the automatic equalization controller 12 at the time when a run-up pattern produced by the run-up pattern generator 3 of the present invention shown in FIG. 1 is once recorded and reproduced during the run-up period.

The signal recorded on the recording medium 7 is reproduced by the reproducing head 8, is passed through the reproducing amplifier 9, and is supplied to the equalizer 11 after the compensation for the differentiating characteristic of the electro-magnetic and magneto-electric conversion mechanisms has been made by the integrator 10. In the equalizer 11, optimum equalization is made through a control by the automatic equalization controller 12 to make compensation for an inter-code interference of the reproduced signal which may be caused by an influence of the electro-magnetic and magneto-electric conversion mechanisms including the recording head 6, the recording medium 7 and the reproducing head 8. In the automatic equalization controller 12, each of the reproduced signal X equalized by the equalizer 11 and band-limited by the low pass filter 13 and the reproduced data Y obtained by supplying the reproduced signal X to the zero-crossing detector 14 is divided into two (high and low) frequency regions as shown in FIG. 5, the signal energy level of the reproduced signal X and the reproduced data Y in each frequency region are compared with each other to obtain an error signal, and an equalization amount is determined on the basis of the error signal so that the equalization characteristic becomes optimum. The equalizer 11 is controlled in accordance with the determined equalization amount. The reproduced signal subjected to the optimum equalization is digitized by the zero-crossing detector 14 into binary reproduced data and thereafter it is supplied to the discriminator 15 and the clock reproducing PLL 16. The clock reproducing PLL 16 reproduces a clock signal synchronized with the rising and falling edges of the reproduced data supplied from the zero-crossing detector 14. In the discriminator 15, the reproduced data supplied from the zero-crossing detector 14 is discriminated at a period of the clock signal reproduced by the clock reproducing PLL 16. The data output from the discriminator 15 and the reproduced clock output from the clock reproducing PLL 16 are supplied to the succeeding decoding circuit (not shown).

As has been described above, in the present embodiment, the run-up pattern generator 3 is provided to produce a run-up pattern satisfying the condition for the short-time settlement of the clock reproducing PLL 16 and the automatic equalization controller 12, and the run-up pattern produced by the run-up code pattern generator 3 is recorded in a run-up period during recording. Thus, as shown in FIG. 5, the signal spectra of the run-up pattern reproduced in the run-up period exist at $f_m/28$, $f_m \cdot 3/28$, $f_m \cdot 5/28$, $f_m/4$ and $f_m \cdot 9/28$, in a signal pass band on the reproducing side, and the signal energy is distributed balancedly in each of the low and high frequency regions for signal comparison. Therefore, the circuit operation of the automatic equalization controller 12 can be settled stably by using the reproduced signal in the run-up period. Accordingly, it is possible to make accurate code detection in the sync period and in the data period in which reproduction is performed continuously after the signal reproduction in the run-up period. Further, since the equalizer can be settled into an optimum equalization condition by the signal reproduction in the run-up period, even if reproduction is made of portions where the recording state has changed stepwise at the time of edition, etc., erroneous discrimination of codes in the sync period and in the data period can be suppressed to a minimum, thereby providing a great practical effect.

Figure 4:
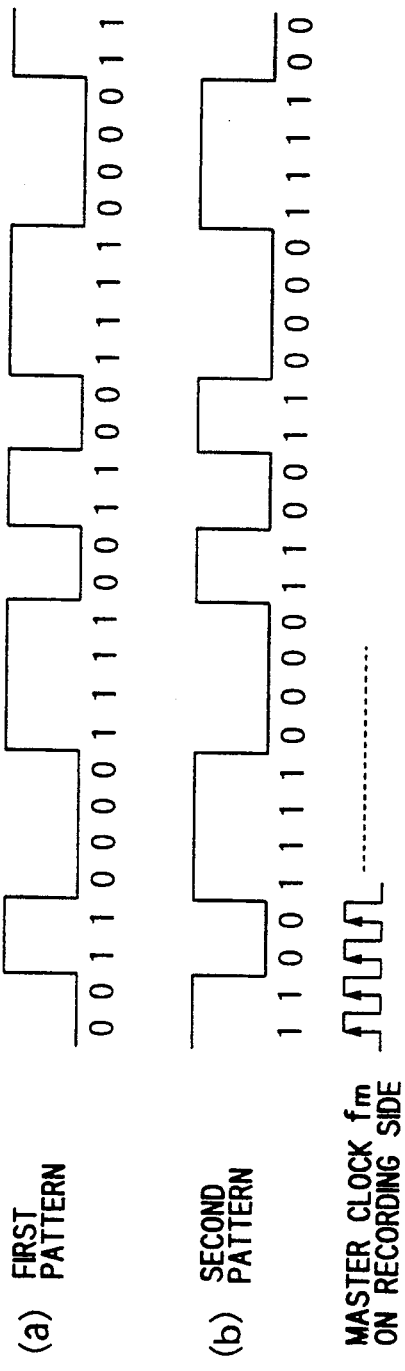
FIG. 4 shows examples of a run-up pattern used in the present invention which is produced by the run-up pattern generator 3 shown in FIG. 1.

The run-up patterns to be produced by the run-up pattern generator may be "01100001111001" and "10011110000110", for example, which are obtained by making a bitshift of the run-up patterns shown in FIG. 4.

Further, there may be a case that the run-up pattern produced by the run-up pattern generator 3 includes a first run-up pattern "00111001100011" produced by the first pattern generator 17 and a second run-up pattern "11000110011100" produced by the second pattern generator 18 (this is the case where a combination of consecutive bit numbers 2 and 3 is used). In this case, either one of the run-up patterns is always selected in accordance with an end pattern of an immediately preceding code word supplied from the multiplexer 4. The selected run-up pattern is outputted repetitively, and it is recorded during the run-up period. Thus, the signal spectra at the time of reproducing the run-up period are distributed at $f_m/14$, $f_m·3/14$ and $f_m·5/14$ in a signal pass band on the reproducing side, and, as a result, signal energy is distributed at lower and higher signal comparison regions, respectively, of the automatic equalization controller 12. Accordingly, it is possible to obtain the same advantage as described before.

In addition, if a scrambled NRZ mode (that is, a mode in which input data is scrambled by the addition thereto of a pseudo-random pattern) is employed as the conversion mode of the code converter 1, an example of the run-up pattern produced by the run-up pattern generator 3 in this case may be "01001101" (the case where a combination of consecutive bit numbers 1 and 2 is used), or "01110001" (the case where a combination of consecutive bit numbers 1 and 3 is used). Also, in this case, an advantage similar to that described above can be obtained, since reproduced spectra obtained by recording and reproducing such a run-up pattern are distributed balancedly at $f_n/8$, $f_n/4$, $f_n·3/8$, $f_n/2$ and $f_n·5/8$ (where $f_n$ is a recording bit clock) in a signal pass band on the reproducing side. If a scrambled NRZ mode is used as the conversion mode of the code converter 1, the cutoff frequency of the low pass filter 13 is $f_n/2$, and the cutoff frequencies of the high and low error signal comparison regions, respectively, of the automatic equalization controller 12 are approximately $f_n·5/16$.

We claim:

1. A digital signal recording/reproducing system comprising:
   code conversion means for producing code words from input data;
   sync pattern generating means for producing a sync pattern;
   run-up pattern generating means for producing a run-up pattern comprising a combination of at lest two digital value series of different inversion intervals;
   change-over means, connected to said code conversion means, said sync pattern generating means and said run-up pattern generating means, for forming time series data of the code words, the sync pattern and the run-up pattern respectively produced by said code conversion means, said sync pattern generating means and said run-up pattern generating means in accordance with a recording format;
   recording and reproducing means for producing a recording signal in the form of said time series data formed by said change-over means, recording said signal on a recording medium and reproducing said signal from said recording medium;
   equalizing means for equalizing said signal reproduced by said recording and reproducing means to produce an equalized signal;
   discriminating means for discriminating the equalize signal produced by said equalizing means; and
   decoding means for decoding the equalized signal which as been discriminated by said discriminating means.

2. A digital signal recording/reproducing system comprising:
   code conversion means for converting input data which is sectioned into sections of eight bits into 14-bit code words, said code conversion means limiting the number of consecutive bits of a same binary value contained in a bit string obtained by connecting said code words with each other to a number which is not smaller than 2 and not greater than 7;
   sync pattern generating means for generating a sync pattern;
   run-up pattern generating means for generating, repetitively and at a fixed period, a run-up pattern comprising a combination of two consecutive bits and group consecutive bits of a same binary value, respectively, or a combination of two consecutive bits and three consecutive bits of a same binary value, respectively;
   change-over means, connected to said code conversion means, said sync pattern generating mean and said run-up pattern generating means, for forming time series data of the code words, the sync pattern and the run-up pattern produced by said code conversion means, said sync pattern generating means and said run-up pattern generating means, respectively, in accordance with a recording format;
   recording and reproducing means for producing a recording signal in the form of said time series data formed by said change-over means, recording said signal on a recording medium and reproducing said signal from said recording medium;
   equalizing means for equalizing said signal reproduced by said recording and reproducing means to produce an equalized signal;
   discriminating means for discriminating the equalized signal produced by said equalizing means; and
   decoding means for decoding eh equalized signal which has been discriminated by said discriminating means.

3. A digital signal recording/reproducing system comprising:
   code conversion means for converting input data to scrambled NRZ code words;
   sync pattern generating means for generating a sync pattern;
   run-up pattern generating means for generating, repetitively and at a fixed period, a run-up pattern comprising a combination of one bit and two consecutive bits of a sam binary value, respectively, or a combination of one bit and three consecutive bits of a same binary value, respectively;
   change-over means, connected to said code conversion means, said sync pattern generating mean and said run-up pattern generating means, for forming time series data of the code words, the sync pattern and the run-up pattern produced by said code conversion means, said sync pattern generating means and said run-up pattern generating means, respectively, in accordance with a recording format; and recording and reproducing means for producing a recording signal in the form of said time series data formed by said change-over means, recording said signal on a recording medium and reproducing said signal from said recording medium.

4. A digital signal recording/reproducing system as in claim 3, further comprising 'equalizing mean for equalizing said signal reproduced by said recording and producing means to produce and equalized signal;

discriminating means for discriminating the equalized signal produced by said equalizing means; and decoding means for decoding the equalized signal which has been discriminated by said discriminating means.

5. A digital signal recording/reproducing system as in claim 1, wherein said run-up pattern generating means produces said run-up pattern independently of said input data.

6. A digital signal recording/reproducing system as in claim 2, wherein said run-up pattern generating means produces said run-up pattern independently of said input data.

7. A digital signal recording/reproducing system as in claim 3, wherein said run-up pattern generating means produces said run-up pattern independently of said input data.

8. A digital signal recording/reproducing system as in claim 1, wherein said run-up pattern occurs before said code word and said sync pattern in said time series data.

9. A digital signal recording/reproducing system as in claim 2, wherein said run-up pattern occurs before said code word and said sync pattern in said time series data.

10. A digital signal recording/reproducing system as in claim 3, wherein said run-up pattern occurs before said code word and said sync pattern in said time series data.

* * * * *